D. ELDRIDGE.
Corn Sheller.
No. 7,781.
Patented Nov. 19, 1850.
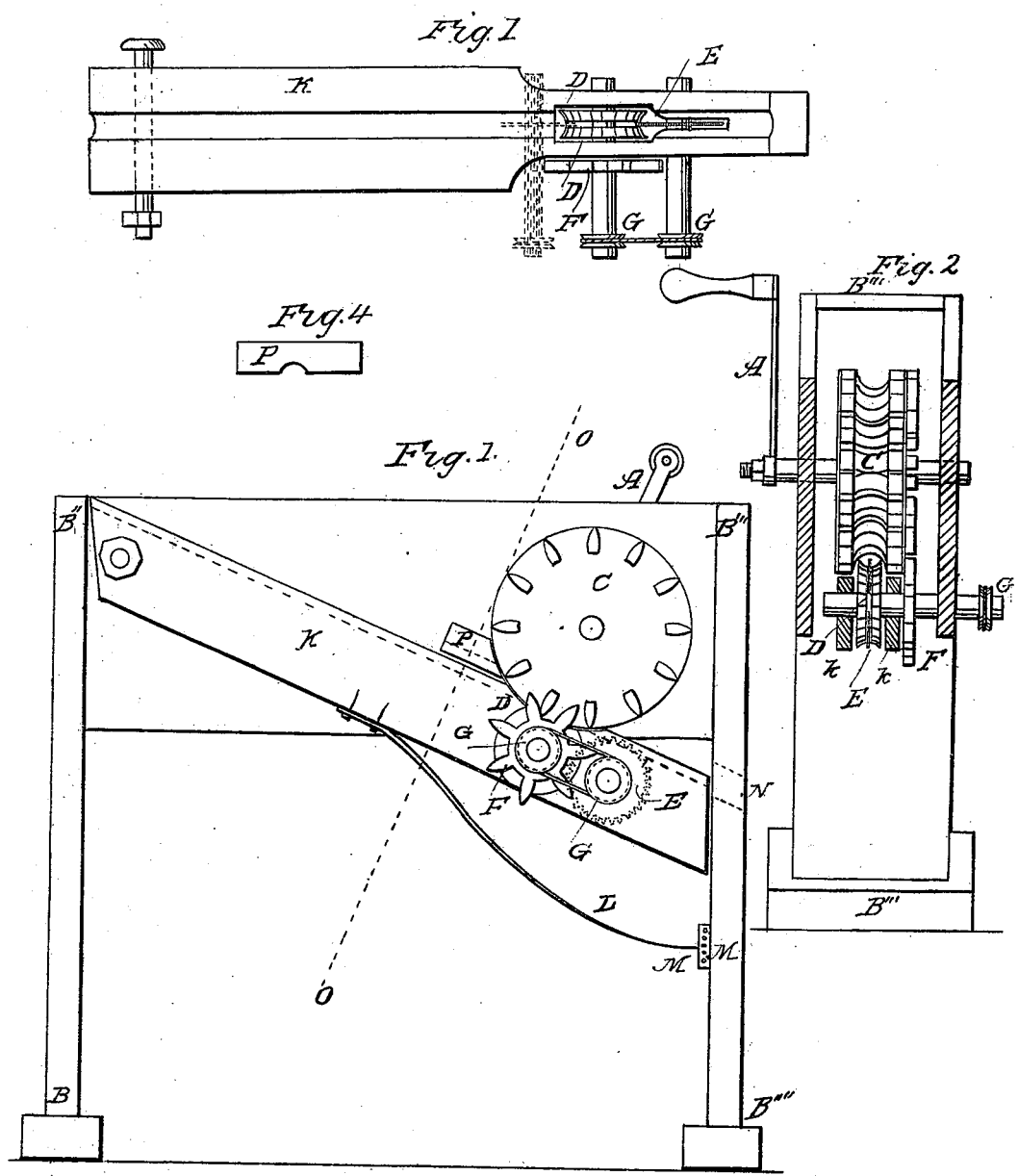

UNITED STATES PATENT OFFICE.

DAVID ELDRIDGE, OF PHILADELPHIA, PENNSYLVANIA.

CORN-SHELLER.

Specification of Letters Patent No. 7,781, dated November 19, 1850.

*To all whom it may concern:*

Be it known that I, DAVID ELDRIDGE, of Philadelphia, in the county of Philadelphia and State of Pennsylvania, having invented a new and useful Improvement in Corn-Shellers; and I do hereby declare that the following is a full, clear, and exact description of the construction and operation of the same; reference being had to the annexed drawing, making a part of this specification, in which—

Figure 1 is a side view of the interior. Fig. 2 a front view as seen when cut through O, O. Fig. 3 an upper view of the shoot and lower wheels. Fig. 4 an end view of the guard.

A, represents the crank; B', B'', B''', B'''' the frame; C, the large concave wheel; D, a small concave wheel; E, a rag wheel; F, a small cog wheel; G' G'', are two pulleys; K, is a shoot; L, the spring; M' M'', are two cleats; N, a hole; P, the guard.

To enable others skilled in the art to make and use my improvement, I will proceed to describe its construction and operation. The large wheel C, is made of cast iron in two pieces fastened together on the shaft forming one wheel about nine inches in diameter, and three in thickness. Its concave is one and half inches deep and about the same in width. It takes off the corn on the upper part of the ear. The cogs on its side turns the lower wheels. Care should be taken in making this wheel to have no unnecessary metal. Its weight is about six pounds. The small wheel D is also made in two pieces and fastened on the shaft, leaving room for the rag wheel E, to run betwixt them; it is about three inches in diameter and one and a quarter thick running into the concave of the large wheel C, and so fastened to the shoot that it can strike the corn and not the cob. The rag wheel E, is two and a half in diameter or larger as required but so placed that it may be a half inch above the small wheel D, so it can stick into the cob and hold it back, so that the other two wheels C, and D, will have time to take off the corn, its thickness about a quarter of an inch and its speed about one third of C, and D, it can be run by a pulley or geared into the large wheel. The cog wheel F is about four and half inches in diameter. The hole N, in the frame is to let the cob pass through separate and apart from the corn. The guard P, is to help hold back the ear and to keep it down so the wheels C, shall not scrape too hard upon the cob. (And if this should not be sufficient to hold back the ear when the corn is wet or damp I shall require the privilege of placing therein another rag wheel likeunto E, as may be seen marked in the Fig. 3, with red ink.)

My improvements in corn shellers is for the purpose of cheapening their construction and facilitating the labor of shelling. By this improvement the corn is shelled endwise or lengthwise of the ear, the cob passing straight through without revolving. Thereby requiring no gearing to increase its speed, but running so easy that by adding a small fly wheel it can be turned by a treadle leaving both hands free so that one man can both turn and feed it at the same time. The cobs passing through the frame into a basket separate and apart from the corn. Most of the machines now in use require one to turn another to feed and the third to pick up and separate the cobs from the corns. Three persons to do what can be done by one with my improvement.

What I claim as new and my improvement and desire to secure by Letters Patent, is—

The combination of the wheel C, D, and E, for shelling corn, as herein described.

DAVID ELDRIDGE.

Witnesses:
 JOSEPH A. WILDER,
 JAMES E. SPAM.